W. L. PATTERSON.
DISSOLVING PROJECTION LANTERN.
APPLICATION FILED OCT. 8, 1918.
1,365,723.
Patented Jan. 18, 1921.
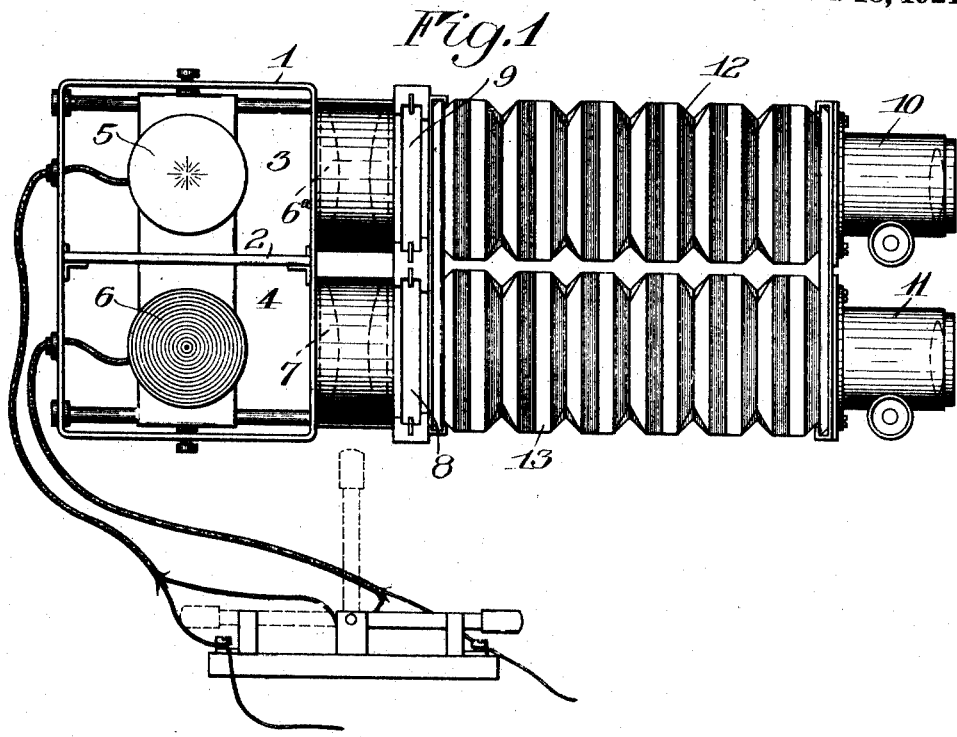
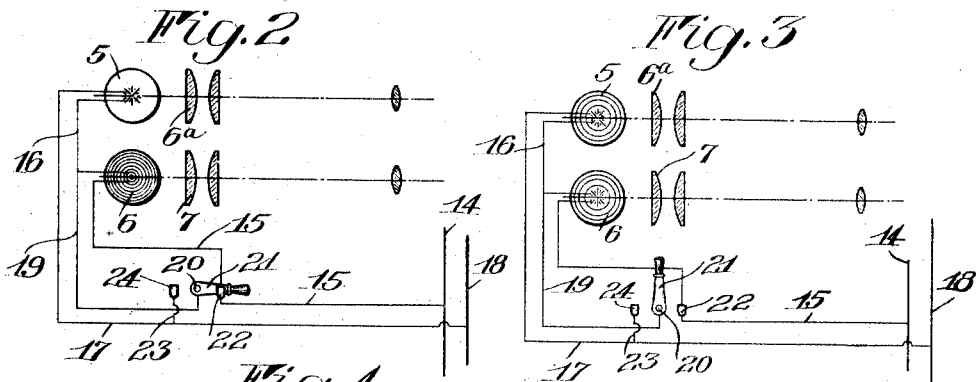
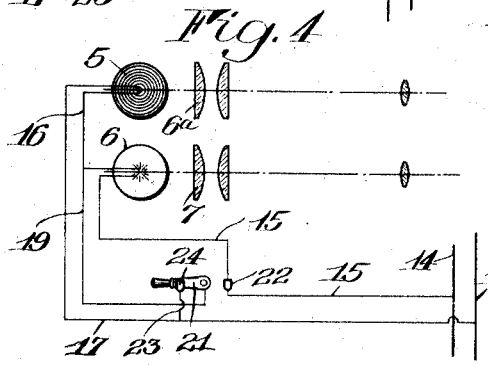
INVENTOR
William L. Patterson
BY
his ATTORNEYS

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

DISSOLVING PROJECTION-LANTERN.

1,365,723.  Specification of Letters Patent.  Patented Jan. 18, 1921.

Application filed October 8, 1918. Serial No. 257,337.

*To all whom it may concern:*

Be it known that I, WILLIAM L. PATTERSON, a citizen of the United States, residing at Rochester, in the county of Monroe, State of New York, have invented certain new and useful Improvements in Dissolving Projection-Lanterns; and I do declare the following to be a full, clear, and exact description of the same, reference being had to the accompanying drawings, forming a part of this specification, and to the characters of reference marked thereon.

This invention relates to dissolving view projection apparatus for lanterns of the kind disclosed in my Patent No. 1,254,724, and is in the nature of an improvement on the apparatus disclosed in said patent. The object of my invention is to provide an improved illuminating system for dissolving view projection lanterns having two optical condensers and projecting devices.

More specifically the object of my invention is to provide a pair of combined projection devices for producing the so-called dissolving change from one projected image to another with a system for controlling the operation of the illuminating lamps of a simple, effective and convenient character, obviating the use of variable resistances or other mechanisms tending to consume power and require operating skill.

Another object is to provide apparatus of the above character having the lamps thereof connected to a source of electrical power by means of circuits so arranged that the mere opening and closing of a simple switch serves to vary the intensity of illumination of the lamps in coördination with each other.

Referring more particularly to the drawings:

Figure 1 is a plan view of a projection lantern constructed in accordance with my invention, Figs. 2, 3 and 4 are diagrammatic views showing the illuminating lamps and circuits therefor and the controlling switch in various positions for producing different illuminating effects.

The lamp house 1 has a longitudinal partition 2 to provide two chambers 3 and 4 in which are placed the illuminating means or lamps 5 and 6, respectively. Forwardly of each of the chambers 3 and 4 is a pair of condensing lenses 6ª and 7, and in front of the condensing lenses is a pair of pockets 8 and 9 for the picture slide holders. Between the picture slide holders and the mountings 10 and 11 for the objective lenses is a pair of bellows 12 and 13. For operating the lamps an electric current is passed from the side 14 of the main line through the conductor 15, the lamp 6, conductor 16, lamp 5, conductor 17, back to the side 18 of the main line. It will be noted that by this construction the lamps 5 and 6 are always connected in series. A conductor 19 is connected to the conductor 16 between the lamps and leads to a binding post 20 to which is pivoted a controlling means or switch 21. A binding post 22 is provided in the conductor 15 and a conductor 23 connects the conductor 17 with a binding post 24. The switch 21 is adapted to coöperate with the binding posts 22 and 24. When in the position shown in Fig. 2 the switch connects the conductor 19 with the conductor 15 and with this arrangement the current flows through the conductor 15 to the binding post 22 through the switch 21, the conductor 19, conductor 16, lamp 5 and conductor 17, lamp 5 being operated at maximum intensity of illumination and lamp 6 being short-circuited and therefore extinguished. With the switch in the position shown in Fig. 4 the conductor 17 is connected through the conductor 23 with the conductor 19 and the current flows through the conductor 15, the lamp 6, conductor 19, switch 21, conductor 23 and conductor 17, lamp 6 in this position of the switch being operated at maximum intensity of illumination and lamp 5 being short-circuited or extinguished. When the switch is open, as shown in Fig. 3, the same current flows through both lamps as they are connected in series, but each lamp is operated at partial intensity of illumination because of the resulting decrease in voltage impressed on each.

It will be noted that by the arrangement shown an electric current is directed through the two lamps in series when the switch is open. When, however, the switch is closed, the current is directed through one only of the lamps. The effect is that when the switch is open both lamps glow with partial intensity, and when either lamp alone is connected with the source of power it is illuminated to its full capacity, while the other lamp fades away and is extinguished. In practice, it is desirable when changing a picture on the screen to have one picture gradually fade away while the other gradually appears without completely removing the illumination of the screen. With my apparatus this is readily accomplished, since by illuminating first one lamp, and then the other in the manner described, the lamp being illuminated glows before it reaches its full illuminating capacity, and the lamp being extinguished has a period of afterglow due to the fact that when the switch is in the intermediate position shown in Fig. 3 the lamps are connected in series, with partial voltage only impressed on each. The period elapsing between the illumination of one lamp to full illuminating capacity and the extinguishing of the other lamp is under the control of the operator, who, by experience, can determine just how rapidly the switch should be moved in changing from one picture or lamp to the other to secure the desired effect.

Having described my invention what I claim and desire to secure by Letters Patent is:

1. In a dissolving view projection lantern, a pair of projection devices, an illuminating lamp for each device, and electrical connections between said lamps and a source of power comprising controlling means for first connecting one lamp with said source of power, and subsequently connecting both lamps in series with the source of power, and finally disconnecting the first lamp from said source of power, for producing a dissolving change from one projected image to another with substantially constant illumination of the screen.

2. In a dissolving view projection lantern, a pair of projection devices, illuminating means for each device, electrical connections between said illuminating means and a source of power, and controlling means for said connections comprising a switch arranged in one position to connect one illuminating means with the source of power with the other illuminating means short-circuited, in another position to short-circuit said first illuminating means and connect said other illuminating means with the source of power and in an intermediate position to connect both illuminating means in series with the source of power.

3. A dissolving view projection lantern, a pair of electrical illuminating means for said lantern connected in series with a source of power, and switch having an open position and movable therethrough to closed positions arranged to alternately short circuit said illuminating means.

4. In an optical projection apparatus, the combination with a pair of projecting devices of a lamp for each device, circuit connections for supplying power to each lamp, and a two-way switch in said circuit connections adapted, when in one position to impress line voltage upon one lamp and no voltage upon the other, and when in the other position to impress line voltage upon the previously inoperative lamp and no voltage upon the first mentioned or formerly lighted lamp, and when in any intermediate position to impress a partial voltage upon both lamps, which partial voltage is substantially constant in any intermediate position of the switch.

WILLIAM L. PATTERSON.